W. B. Rice,
Reading Blocks.
Nº 41,536.   Patented Feb. 9, 1864.
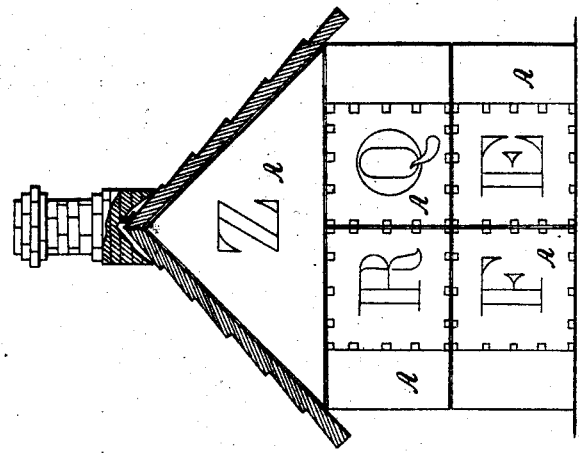
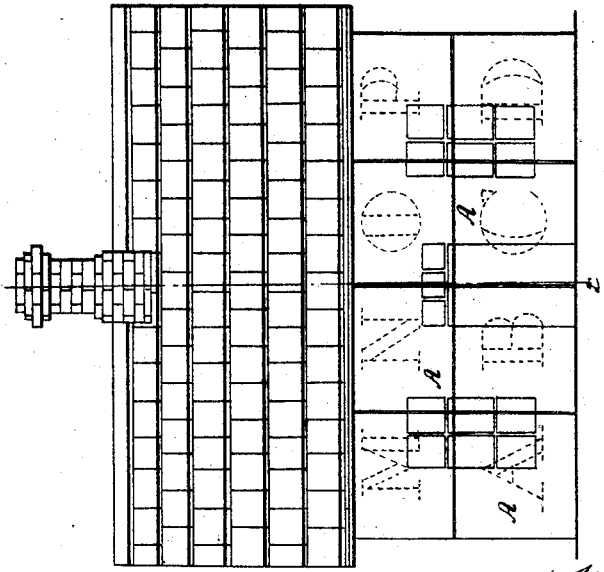
Witnesses.
Inventor.
W. B. Rice
per Munn & Co

UNITED STATES PATENT OFFICE.

W. B. RICE, OF FELTONVILLE, MASSACHUSETTS.

PUZZLE FOR CHILDREN.

Specification forming part of Letters Patent No. 41,536, dated February 9, 1864.

*To all whom it may concern:*

Be it known that I, W. B. RICE, of Feltonville, in the county of Middlesex and State of Massachusetts, have invented a new and Improved Puzzle; and I do hereby declare that the following is a full, clear, and exact description of the same, reference being had to the accompanying drawings, forming a part of this specification, in which—

Figure 1 represents a front elevation of my invention. Fig. 2 is a transverse vertical section of the same, taken in the plane indicated by the line $x\,x$, Fig. 1.

Similar letters of reference indicate corresponding parts in both figures.

This invention consists in the employment or use of a series of blocks marked on one side with parts of a certain picture—such as the doors and windows of a cottage—and on the other side with a consecutive series of letters or figures—such as the consecutive letters of the alphabet—in such a manner that the letters or figures on one side form the key for the picture on the opposite side, and by following said key the blocks can be readily arranged or put up in the proper order so as to exhibit the picture.

To enable those skilled in the art to make and use my invention, I will proceed to describe it.

A A represent a series of blocks, which may be square or of any other desirable form or forms, either parallel opipedons and triangles, as shown in the drawings, or of different forms, according to the picture or toy to be represented. These blocks are marked on one side with the letters of the alphabet and on the other side with portions of the doors and windows of a cottage. The letters on the inside form the key for the puzzle.

If it is desired to put up the blocks so that they will represent a cottage with doors and windows the letters on the inside must be placed in regular order, commencing with the A, and so on, as indicated in Fig. 1 of the drawings. By doing so the parts of windows and doors marked on the outside will join in the proper manner and the cottage can easily be formed. A person not acquainted with the key, however, will have great difficulty to arrange the blocks in the proper order.

From this simple example it is apparent that any other picture or toy can be represented in the same manner by using blocks of different shape and form. A horse, a chair, a landscape, or other devices might be represented in the same manner, and instead of using the letters of the alphabet for the key a sentence might be selected and written on one side of the blocks, or any other desirable series of characters would serve the same purpose.

I have selected the blocks A A to represent my invention, because those blocks in themselves form a desirable toy for children, and by adding the puzzle the value of this toy will be considerably enhanced.

By using my puzzle a child will readily learn the alphabet, for without knowing the alphabet it is impossible to arrange the blocks in the proper order to represent a cottage.

What I claim as new, and desire to secure by Letters Patent, is—

1. The employment or use of a series of blocks, A, marked on one side with a series of letters or figures and on the opposite side with parts of a picture, said letters to form the key for the picture, substantially as and for the purpose shown and described.

2. As a new article of manufacture, the alphabet, blocks, puzzle, and cottage, combined as herein specified.

W. B. RICE.

Witnesses:
JAMES T. JOSLIN,
HORATIO H. HUTCHINS.